(12) United States Patent
Amid (10) Patent No.: US 10,432,613 B2
(45) Date of Patent: Oct. 1, 2019

(54) HTTPS ENABLED CLIENT TOOL

(71) Applicant: Dell Products L. P., Round Rock, TX (US)

(72) Inventor: Sahul Amid, Bangalore (IN)

(73) Assignee: Dell Products L. P., Round Rock, TX (US)

( * ) Notice: Subject to any disclaimer, the term of this patent is extended or adjusted under 35 U.S.C. 154(b) by 125 days.

(21) Appl. No.: 15/684,529

(22) Filed: Aug. 23, 2017

(65) Prior Publication Data

US 2019/0068580 A1 Feb. 28, 2019

(51) Int. Cl.
*H04L 29/06* (2006.01)
*H04L 29/08* (2006.01)
*G06Q 30/00* (2012.01)

(52) U.S. Cl.
CPC .......... *H04L 63/0823* (2013.01); *H04L 67/02* (2013.01); *H04L 67/38* (2013.01); *G06Q 30/016* (2013.01)

(58) Field of Classification Search
CPC .... H04L 63/0823; H04L 67/02; G06Q 30/016
USPC .......................................................... 726/7
See application file for complete search history.

(56) References Cited

U.S. PATENT DOCUMENTS

| | | | | |
|---|---|---|---|---|
| 10,110,563 | B1 * | 10/2018 | Ganesh | H04L 63/0263 |
| 2002/0138786 | A1 * | 9/2002 | Chefalas | G06F 8/61 |
| | | | | 714/37 |
| 2007/0143614 | A1 * | 6/2007 | Holtmanns | H04L 63/067 |
| | | | | 713/171 |
| 2008/0082662 | A1 * | 4/2008 | Dandliker | H04L 63/10 |
| | | | | 709/225 |
| 2013/0117439 | A1 * | 5/2013 | Oliver | H04L 65/1069 |
| | | | | 709/224 |
| 2013/0145165 | A1 * | 6/2013 | Brown | H04L 9/3247 |
| | | | | 713/176 |
| 2014/0032254 | A1 * | 1/2014 | Della Corte | G06Q 30/016 |
| | | | | 705/7.14 |
| 2014/0129828 | A1 * | 5/2014 | Rhee | H04L 63/0823 |
| | | | | 713/156 |
| 2014/0164776 | A1 * | 6/2014 | Hook | H04L 9/14 |
| | | | | 713/171 |
| 2017/0262629 | A1 * | 9/2017 | Xu | H04L 63/1425 |

(Continued)

*Primary Examiner* — Tae K Kim
*Assistant Examiner* — Peiliang Pan
(74) *Attorney, Agent, or Firm* — Campbell Stephenson LLP; Shiv S. Naimpally (57) ABSTRACT

A system that implements a Hypertext Transfer Protocol Secure (HTTPS) enabled client tool to facilitate HTTPS communication between a client device (on which the tool is installed) and a remote browser through which online product support to the client device is provided. The client tool creates a unique self-signed digital certificate on the fly and is used for client-server authentication purpose. The validity of the certificate is set to one day to avoid its re-use. A unique private key for the certificate is generated as well and is neither shared with other client devices nor made available after authentication. In an HTTPS session, the certificate is renewed and re-authenticated every one hour of interaction with the remote browser. The most recent version of the certificate is stored. When the client tool application is exited or stopped, the stored certificate is deleted. This ensures a secure communication between the client device and the remote browser.

20 Claims, 5 Drawing Sheets

100

(56) References Cited

U.S. PATENT DOCUMENTS

| | | | |
|---|---|---|---|
| 2018/0091552 A1* | 3/2018 | Hsiung | H04L 63/1466 |
| 2018/0097840 A1* | 4/2018 | Murthy | H04L 63/1425 |
| 2018/0176240 A1* | 6/2018 | Kopp | H04L 63/1425 |

* cited by examiner

HTTPS ENABLED CLIENT TOOL

TECHNICAL FIELD

This disclosure relates generally to website-based remote product support and, more particularly, to a product support environment in which a client tool installed in a product enables a Hypertext Transfer Protocol Secure (HTTPS) communication between the product and a website of a vendor of the product or an affiliate of the vendor providing remote troubleshooting and support for the product.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. These devices may vary in size, shape, performance, functionality, and price. While these devices or products are covered under warranty (and many times even beyond the expiry of the warranty period), it is typical for the vendors (or manufacturers) of these products to provide post-purchase product support and troubleshooting assistance over the Internet through an online website such as, for example, a website of the vendor dedicated for technical assistance and product support, or a general website of the vendor through which the product may be sold as well as supported during its warranty coverage (and even beyond the warranty period), or a website of an affiliate of the vendor authorized by the vendor to provide online technical support to the purchasers of vendor's products. In this manner, client devices may be routinely supported post purchase using a web-based assistance mechanism, which may provide relevant product documentation and interactive troubleshooting and technical support for the product.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to a product support environment in which an HTTPS enabled client tool—a software application—is installed in a product to facilitate a secure HTTPS communication between the product and a remote browser associated with a website of a vendor of the product or an affiliate of the vendor providing remote troubleshooting and support for the product. In particular embodiments, the program code for the client tool may cause the client machine (or product) to create a unique, self-signed digital certificate on the fly when the client tool application is being installed in the client's machine. The usage of this certificate may be restricted to the client-server authentication purpose. In a remote browser-based troubleshooting or product support scenario, the machine or product running the client tool may function as a "server" whereas the remote browser may function as a "client" as discussed in more detail later below. The private key of the digital certificate may be unique to the client machine and may not be shared with other client systems. The private key also may be deleted or made unavailable in the client machine after the initial client-server authentication. Additional security may be provided by restricting the validity of the digital certificate to one (1) day so that it cannot be re-used the next day. Furthermore, during an HTTPS session, the certificate may be renewed fresh every one (1) hour of interaction with the remote browser. No version of the digital certificate may remain stored in the certificate store managed by the client machine's operating system while exiting or stopping the client tool application on the client product. In particular embodiments, the client tool is designed to operate with Microsoft Windows® based operating systems.

In one embodiment, the present disclosure is directed to a method, which comprises: (i) creating, by a computing system, a self-signed digital certificate uniquely associated with the computing system and a remote browser, wherein the digital certificate has a validity period of one day and is usable for client-server authentication purpose in a bi-directional HTTPS communication between the computing system and the remote browser; (ii) providing, by the computing system, the digital certificate to the remote browser for authentication of the computing system as a server in the HTTPS communication; (iii) generating, by the computing system, a unique private key for the digital certificate, wherein the private key is made unavailable in the computing system after authentication of the computing system; and (iv) upon successful authentication, performing, by the computing system, the bi-directional HTTPS communication with the remote browser. The method also comprises preventing, by the computing system, generation of digital certificates for websites other than the website associated with the remote browser.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) create a self-signed digital certificate uniquely associated with the computing system and a remote browser, wherein the digital certificate has a validity period of one day and is usable for client-server authentication purpose in a bi-directional HTTPS communication between the computing system and the remote browser; (ii) provide the digital certificate to the remote browser for authentication of the computing system as a server in the HTTPS communication; (iii) generate a unique private key for the digital certificate, wherein the private key is made unavailable in the computing system after authentication of the computing system; and (iv) upon successful authentication, perform the bi-directional HTTPS communication with the remote browser over an Internet Protocol (IP) network. In one embodiment, the IP network is the Internet.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (a) creating a self-signed digital certificate uniquely associated with the computing system and a remote browser, wherein the digital certificate has a validity period of one day and is usable for client-server authentication purpose in a bi-directional HTTPS communication between the computing system and the remote browser; (b) providing the digital certificate to the remote browser for authentication of the computing system as a server in the HTTPS communication; (c) generating a unique private key for the digital certificate, wherein the private key is made unavailable in the computing system after authentication of the computing system; and (d) upon successful authentication, performing the bi-directional HTTPS communication with the remote browser.

With increasing number of websites offering HTTPS based communication for secure browsing experience, an HTTPS-enabled client tool as per teachings of the present disclosure allows a product vendor to provide remote product support and technical assistance through an HTTPS site, thereby offering an end-to-end secure HTTPS communication channel between the vendor's website and the client product on which the client tool is installed. The minimal validity (of one day) of the digital certificate created upon installation of the client tool, the periodic renewal of the digital certificate during an extended HTTPS session with the vendor's support website, the deletion of the private key associated with the digital certificate, and the removal of all versions of the digital certificate stored in the Windows® certificate store (in the client product) result in a robust and secure product support experience for the user.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "device-specific", "computer-readable", etc.) may be occasionally interchangeably used with its non-hyphenated version (e.g., "device specific," "computer readable", etc.), and a capitalized entry (e.g., "Operating System", "Client Computer", etc.) may be interchangeably used with its non-capitalized version (e.g., "operating system," "client computer", etc.). Such occasional interchangeable uses shall not be considered inconsistent with each other.

As mentioned before, it is becoming increasingly common for the vendors (or manufacturers) of information handling systems or products to provide post-purchase product support and troubleshooting assistance over the Internet through an online website such as, for example, a website of the vendor dedicated for technical assistance and product support. Similarly, an increasing number of websites are offering HTTPS based communication for secure browsing experience. However, many product support websites do not offer an end-to-end HTTPS communication between the website and the client product being remotely supported or troubleshot. One reason for such lack of HTTPS availability may be that the remote diagnostic and product support typically involves installing a software tool or application in the client's computer (or other electronic device being remotely diagnosed) from the product support website. This software tool then responds to the requests for basic product information—such as, for example, the software and drivers installed in the system, which driver(s) needs updating or troubleshooting, hardware configuration details of the system, and a preliminary diagnostic report of the system to facilitate troubleshooting—from the product support website. Thus, although the vendor website serves as a host/serving system in performing remote diagnosis and product support of the client device, the manner in which the information is provided by the software tool as part of this remote support process makes the software tool act as a web server (like the Microsoft® Corporation's Internet Information Server (IIS)) and the remote browser (associated with the product support website) act as a "client" of this "server." It is observed that, in the discussion herein, the terms "software tool", "client tool", and "client support tool" may be used interchangeably.

Thus, as noted above, the request-response nature of the remote website based product support operation "reverses" the roles of the client device and the remote browser of the vendor's website. As a result, to enable an HTTPS communication between the software tool (as a "server" in the HTTPS mode) and the remote browser (as a "client" in the HTTPS mode) requires a valid client-server authentication certificate for all the devices/products that use the software tool downloaded from the website associated with the remote browser. However, because of the large number of client devices/products, it would be hugely expensive to obtain a wild card certificate for the software tool usable with all the client devices that could be potentially served by the vendor's product support website. Furthermore, no Certificate Authority (CA) would provide a "localhost" digital certificate for each client device. Additionally, it may not be possible to register any other domain except the default "localhost" in the client machine and, hence, a "localhost" certificate may be needed to establish an HTTPS communication between the "server" (here, the client machine to be supported) and the "client" (here, the browser associated with the product support website of the vendor).

It is pointed out here that software solutions exist to capture HTTPS traffic between a client computer system and one or more remote websites. However, such software applications merely intercept the traffic to/from the client system and log it for the client system's user to review; these applications do not themselves initiate an HTTPS communication with the remote website(s) or respond to HTTPS queries from the website(s). For example, the Fiddler™ software tool (available at www.telerik.com/fiddler) from the Progress Software Corporation of MA, USA, is a web-debugging tool to debug the traffic to/from Personal Computer (PC), Mac, or Linux systems and mobile devices. Fiddler™ is a web debugging proxy which captures all HTTP and HTTPS traffic between a client computer and an Internet website, and logs it for a user to review. Thus, Fiddler™ may be used to debug traffic from virtually any application that supports a proxy such as, for example, the popular web browsers like the Internet Explorer, Firefox®, Google® Chrome®, Safari®, and the like. Fiddler™ uses "man-in-the-middle" interception of HTTP/HTTPS website traffic using self-signed digital certificates. The self-signed digital certificates created by Fiddler™ have the following properties: (i) The purpose of the certificate may be limited to client-server authentication. (ii) The validity of the certificate is more than a year. (iii) Each Fiddler™ installation creates a unique root certificate (which is static) and, using that root certificate, the installed Fiddler™ application will generate multiple end-entity certificates—one for each HTTPS site being intercepted. (iv) The installed certificates may be stored in the Windows® certificate store, but Fiddler™ will not clean/delete the installed certificates, thereby "polluting" the Windows certificate store with used/expired or unnecessary certificates. (v) The private key of a Fiddler-created digital certificate is exportable.

Even though the use of the above-mentioned Fiddler™ application is limited to interception and logging of website traffic, the exportable nature of the private key in a Fiddler™ installation may result in the misuse of the corresponding digital certificate (for example, by a rogue application or malware). The long (one year) validity of the end-entity digital certificates created by Fiddler™ also may jeopardize the security of HTTPS interceptions from different websites because of the potential for misuse of the certificate when the certificate can be re-used multiple times during its validity period of one year. Similarly, the static nature of the root certificate in Fiddler™ may pose a security threat because of the potential for re-use of the certificate over a long period of time.

Like Fiddler™, the current software tools for remote product support have their own limitations as well. For example, in certain currently-available software tools, a self-signed digital certificate is statically bundled along with the tool and, hence, the same digital certificate may be installed in all client machines being supported by the remote website host. The validity of the certificate is long—typically one (1) year. Furthermore, the same private key may be shared among all client machines. The lack of unique, client machine-specific digital certificates and private keys may make the client machines vulnerable to attacks when the security of the (static) common certificate gets compromised at one of the client machines. Furthermore, the self-signed digital certificate is not restricted to client-server authentication purpose, but is rather an "all purpose" certificate. An "all purpose" locally-signed certificate could be exploitable and malware can be authenticated by that certificate.

It is therefore desirable to implement an HTTPS-enabled software tool (or client tool) that facilitates HTTPS communication between a client device (on which the tool is installed) and the remote browser associated with the website providing online product support to the client device. It is also desirable that the HTTPS-enabled client tool ensures that the client machine is not vulnerable to snooping/eavesdropping or "man-in-the-middle" attacks during its bi-directional communication with the remote browser. As mentioned earlier, the terms "software tool", "client tool", and "client support tool" may be used interchangeably herein.

Figure 1:
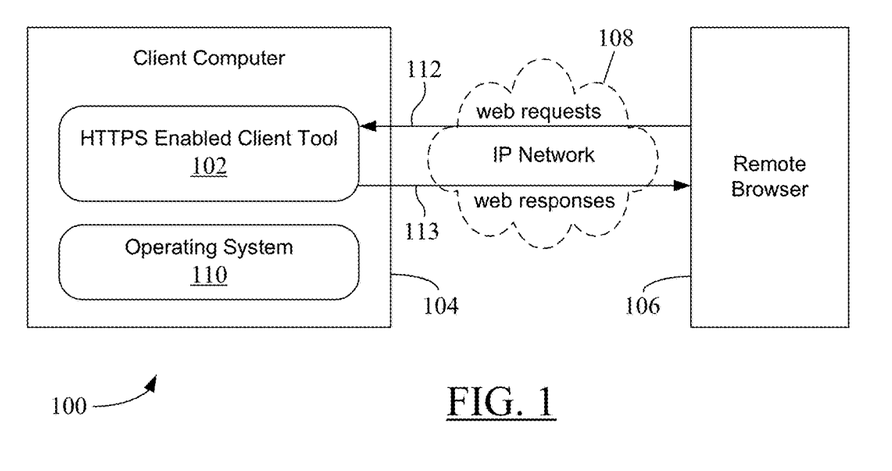
FIG. 1 shows an exemplary arrangement to implement remote product support using an HTTPS-enabled client tool as per particular embodiments of the present disclosure.
Figure 7:
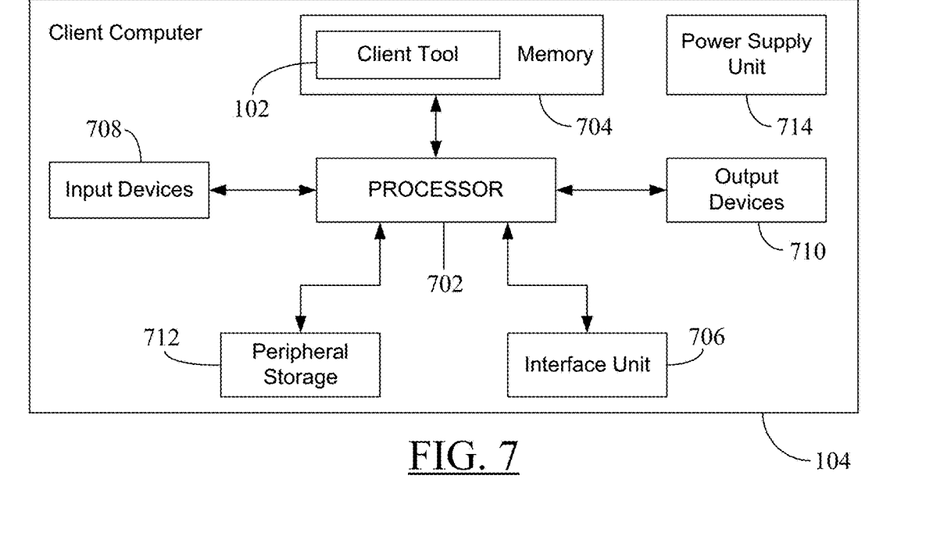
FIG. 7 illustrates an example configuration of a computer system that can be used to implement the HTTPS-enabled client tool described herein.

FIG. 1 shows an exemplary arrangement 100 to implement remote product support using an HTTPS-enabled client tool 102 as per particular embodiments of the present disclosure. The client tool 102 may be a software application comprising program code, which, upon execution by a processor (not shown) in a client computer 104, enables a bi-directional HTTPS communication between the client computer (or client machine) 104 and a remote browser 106. The remote browser 106 may be associated with or represented by an online interactive website such as, for example, a website of a vendor of the client computer 104 dedicated for technical assistance and product support, or a general website of the vendor through which the product 104 may be sold as well as supported during its warranty coverage (and even beyond the warranty period), or a website of an affiliate of the vendor authorized by the vendor to provide online technical support to the purchasers of vendor's products. Generally, the remote browser 106 may be associated with a product support website through which users of client computers can interact with the website for remote product support and troubleshooting assistance. In some embodiments, the client computer 104 may be an information handling system (discussed earlier) and the program code constituting the software tool 102 may be stored in a storage unit or memory (not shown) in the client computer 104. Such memory, processor, and other exemplary architectural details of the client computer 104 are shown in FIG. 7 and discussed later below. In some embodiments, the remote browser 106 may be associated with one or more information handling systems (not shown) managed by a web server that coordinates content delivery to/from these information systems to the client machine 104 via the browser 106. The architectural configuration of the remote browser 106 or associated website (or web server) is not relevant to the present disclosure and, hence, no additional details thereof are provided here.

As illustrated in FIG. 1, the client computer 104 and the remote browser 106 may communicate with each other via a communication network 108 such as, for example, an Internet Protocol (IP) network. In a typical implementation, the IP network 108 may be the Internet. However, in other embodiments, the client machine 104 and the browser 106 may communicate via different types of communication networks that support HTTPS protocol-based bi-directional communication. In one embodiment, when a user of the client computer 104 wishes to obtain remote product support or troubleshooting assistance, the user may access the product support website associated with the remote browser 106 using the corresponding website address in a web browser (not shown) running on the client computer 104. As discussed later with reference to FIGS. 3-5, once the user agrees to certain terms and conditions, the user may download the program code for the client tool 102 from the remote browser 106. The downloaded program code may be stored in a memory (not shown) in the client computer 104 and executed by a processor (not shown) in the client computer 104 under operative control of an Operating System (OS) 110 of the client machine 104. In one embodiment, the cline tool 102 may be a Microsoft® Windows® tool. Although the discussion herein primarily focuses on a Microsoft® Windows® based operating system (such as, for example, Windows XP, Windows 7, 8, or 10, and Windows NT operating systems), a client tool as per the teachings of the present disclosure may be implemented in a client system having a different operating system.

Figure 2:
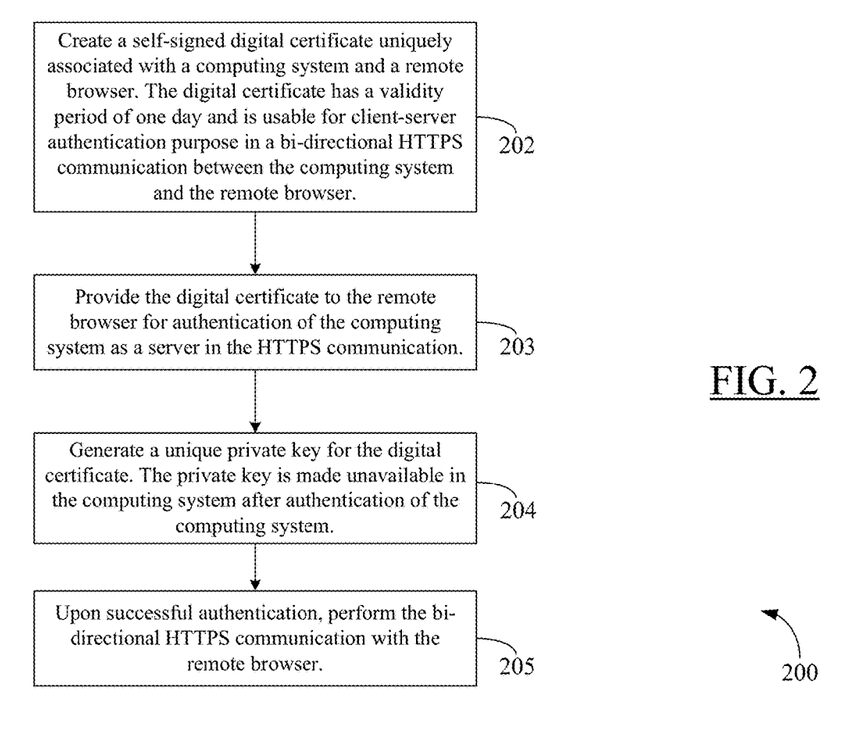
FIG. 2 is an exemplary flowchart depicting various steps that may be performed by a computing system as per particular embodiments of the present disclosure to carry out a bi-directional HTTPS communication with a remote browser.

Upon execution of the downloaded program code for the client tool 102 by a processor (not shown) in the client computer 104, the client computer 104 may perform different operations to carry out a bi-directional HTTPS communication with the remote browser 106. An exemplary set of such operations is illustrated in FIG. 2, which is discussed later below. Generally, as noted earlier, the online website-based remote support process may make the software tool 102 act as a web server and the remote browser 106 act as a "client" of this "server." It is observed here that the term "client" in "client computer" should not be confused with the "client" status of the remote browser 106 resulting from the execution of the software tool 102 to establish HTTPS mode of operation during remote product support. In the absence of installation of the client tool 102 and activation of HTTPS communication using the client tool 102, the remote browser 106 would continue to operate as a server to the client computer 104. Thus, in the limited situation of the client tool-based remote diagnostic and product support through HTTPS communication, the client-server roles may be reversed—with the client tool 102 (and, hence, the client tool-executing computer 104) functioning as an HTTPS "server" whereas the remote browser 106 functioning as an HTTPS "client" communicating with the client tool 102 as its "server". This client-server relationship in the context of the HTTPS communication enabled by the client tool 102 is illustrated by the directional arrows 112-113 in FIG. 1 depicting web requests being sent to the HTTPS "server" 102 (or, equivalently, at the computer 104) and web responses being received at the HTTPS "client" 106, respectively.

In one embodiment, as part of the online product support, the website (or web server) associated with the remote browser 106 may request a "resource" through an HTTPS web request 112 from the browser 106 to the client tool 102. The requested resource may include, for example, one or more of the following: (i) hardware configuration details of the client computer 104, (ii) identification of software applications and software drivers installed on the client machine 104, (iii) the version of each software driver installed on the computing system 104, and (iv) a diagnostic report of the computing system 104 including information such as, for example, which device driver(s) needs update or troubleshooting, which hardware component has failed or not functioning properly, which software application needs updating, and the like. In response to the HTTPS request 112, the client tool 102 may interact with the OS 110 to obtain the requested resource/information about the computer 104 and configure the client computer 104 to send an HTTPS web response 113 to the remote browser 106 containing the requested resource/information. The remote browser 106 may provide the received content to its associated web server or other processing entity to process the received information to determine needed steps for further troubleshooting and product support. Additional request-response based interactions between the remote browser 106 and client tool 102 may occur over a secure HTTPS channel during the product support session.

FIG. 2 is an exemplary flowchart 200 depicting various steps that may be performed by a computing system as per particular embodiments of the present disclosure to carry out a bi-directional HTTPS communication with a remote browser. In one embodiment, the computing system may be client computer 104 and the remote browser may be the remote browser 106 shown in FIG. 1. More generally, the computing system 104 performing the steps shown in FIG. 2 may include in hardware and/or software the functionality of the client tool 102 and, hence, the computing system 104 may be considered an HTTPS-enabled system capable of implementing an HTTPS-based online product support functionality as per teachings of the present disclosure. In one embodiment, the program code for the client tool 102

(and other relevant program code such as the program code for the OS 110) may be executed by a processor (not shown) in the computing system 104 and, upon execution of the program code, the computing system 104 may be operative to perform the tasks illustrated in FIG. 2.

Initially, upon download and installation of the client tool 102, the computing system may create a self-signed digital certificate uniquely associated with the computing system and the remote browser, as noted at block 202. The digital certificate may be needed to facilitate a bi-directional HTTPS communication between the computing system (as an HTTPS "server") and the remote browser (as an HTTPS "client"), as discussed before. In particular embodiments, the digital certificate may have a validity period of one (1) day and may be usable for client-server authentication purpose in the bi-directional HTTPS communication between the computing system and the remote browser, as also noted at block 202. Additional details about the digital certificate and its properties are provided later with reference to discussion of FIGS. 3-6. After the digital certificate is created, the computing system may provide the digital certificate to the remote browser for authentication of the computing system as a server in the HTTPS communication (block 203). This client-server authentication may be a part of the initial "handshake" procedure under HTTPS. In certain embodiments, as noted at block 204, the computing system also may generate a unique private key for the digital certificate created at block 202. The private key may be generated as part of the initial handshake with the remote browser. In particular embodiments, for additional security, the private key may be made unavailable in the computing system after authentication of the computing system, as discussed later. Upon successful authentication, the computing system may perform bi-directional HTTPS communication with the remote browser (block 205). In an HTTPS communication session with the remote browser, the computing system may generate a unique session key to respectively encrypt and decrypt the content being sent to or received from the remote browser. Such content may include the client computer-specific "resource" or information, some examples of which are mentioned before.

FIGS. 3-6 illustrate exemplary screenshots of web pages and OS-generated messages that may be displayed on a display screen (not shown) of the computing system 104 during implementation of the client tool 102 in the computing system 104. In other embodiments, the web pages or messages may differ from the examples shown in FIGS. 3-6.

Figure 3:
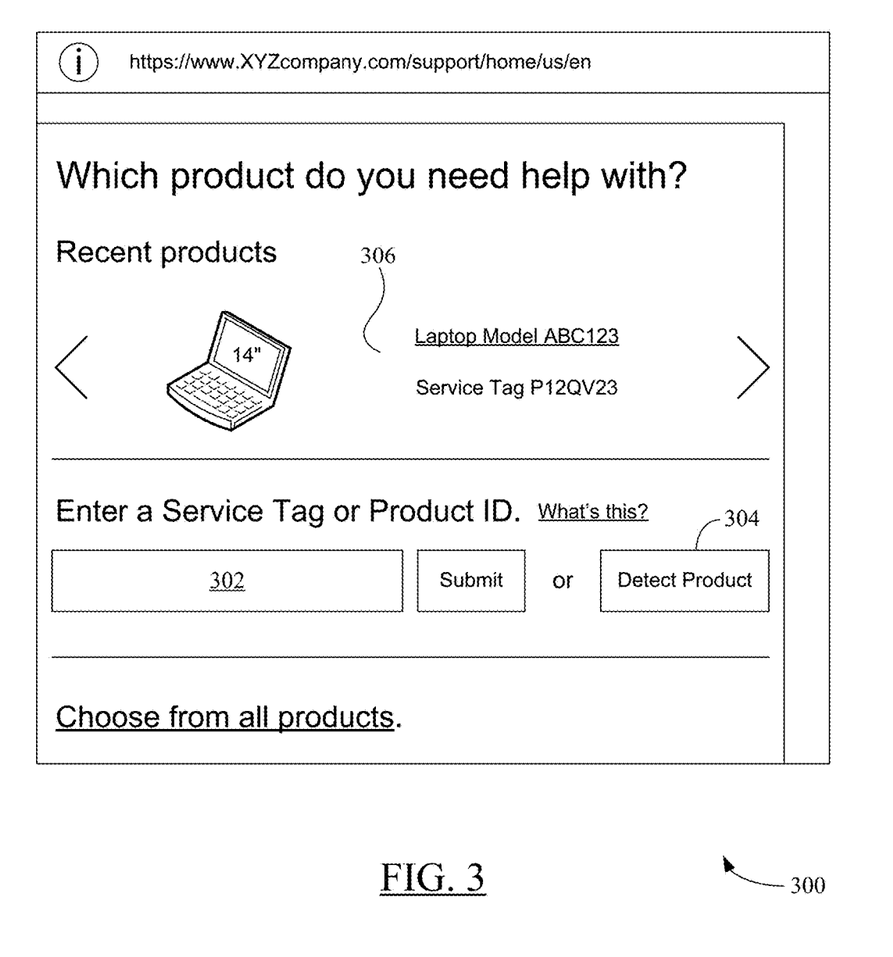
FIG. 3 depicts an exemplary screenshot of the home page of a vendor's product support website from which a user can download an HTTPS-enabled client tool as per particular embodiments of the present disclosure.

FIG. 3 depicts an exemplary screenshot of the home page 300 of a vendor's product support website from which a user can download an HTTPS-enabled client tool, such as the client tool 102 in FIG. 1, as per particular embodiments of the present disclosure. In FIGS. 3-6, the company offering online product support is identified as the "XYZ Company," which may be the vendor of the product (here, the computer system 104) itself or another entity affiliated with the vendor of the product 104 and authorized by the vendor to provide post-purchase product support. In one embodiment, the user may be an operator or owner of the client computer 104 accessing the home page 300 (via the Internet 108) for guidance or information on product support/troubleshooting. In FIG. 3, the HTTPS link for the support website is "https://www.XYZcompany.com/support". The support website—including the home page 300 and any other product support web pages—may be associated with and represented by the remote browser 106 in FIG. 1. Using a web browser (not shown) on the user's computer 104, the user may enter the HTTPS link to visit the home page 300. The downloading and installation of the client tool 102 may be needed before an end-to-end HTTPS communication may be carried out with the support website.

At the home page 300 of the support website, the user may either search all products and enter the Product ID or Service Tag associated with the client computer 104 in the available field 302 or select the "Detect Product" option 304 to let the remote site or browser automatically detect the model (or service tag) of the user's product—here, the client computer 104. In FIG. 3, the Product ID ("ABC123") and Service Tag ("P12QV23") for the client computer 104—as searched by the user—are shown in the "Recent Products" section 306. Even though the user may have searched the correct product ID and service tag for user's product 104, the user may still choose the "Detect Product" option for automatic detection of user's product by the remote site. It is noted here that in the embodiments of FIGS. 3-5, the underlined text—such as, for example, the text "Choose from all products" in FIG. 3 or the text "Order Status" in FIG. 4—may represent a Hypertext Markup Language (HTML) link that may be clicked for additional content.

Regardless of whether the user searches the support website and submits the product information through the field 302 or elects the automatic detection option 304, the user must first install the client tool 102 on the client computer 104 (if not already installed) before automatic product detection and subsequent product support may occur. The program code of the client tool 102, when executed by a processor in the client computer 104, may cause the client tool 102 to communicate with the OS 110 to obtain the product information as part of automatic product detection and display the detected content on a display screen of the computer 104 for user's review. In particular embodiments, the program code of the client tool 102, upon execution by the processor, also may cause the computing system 104 to report the detected product information to the remote browser 106 through an HTTPS message, such as the web response 113, and to perform various tasks discussed later with reference to FIGS. 5-6.

Figure 4:
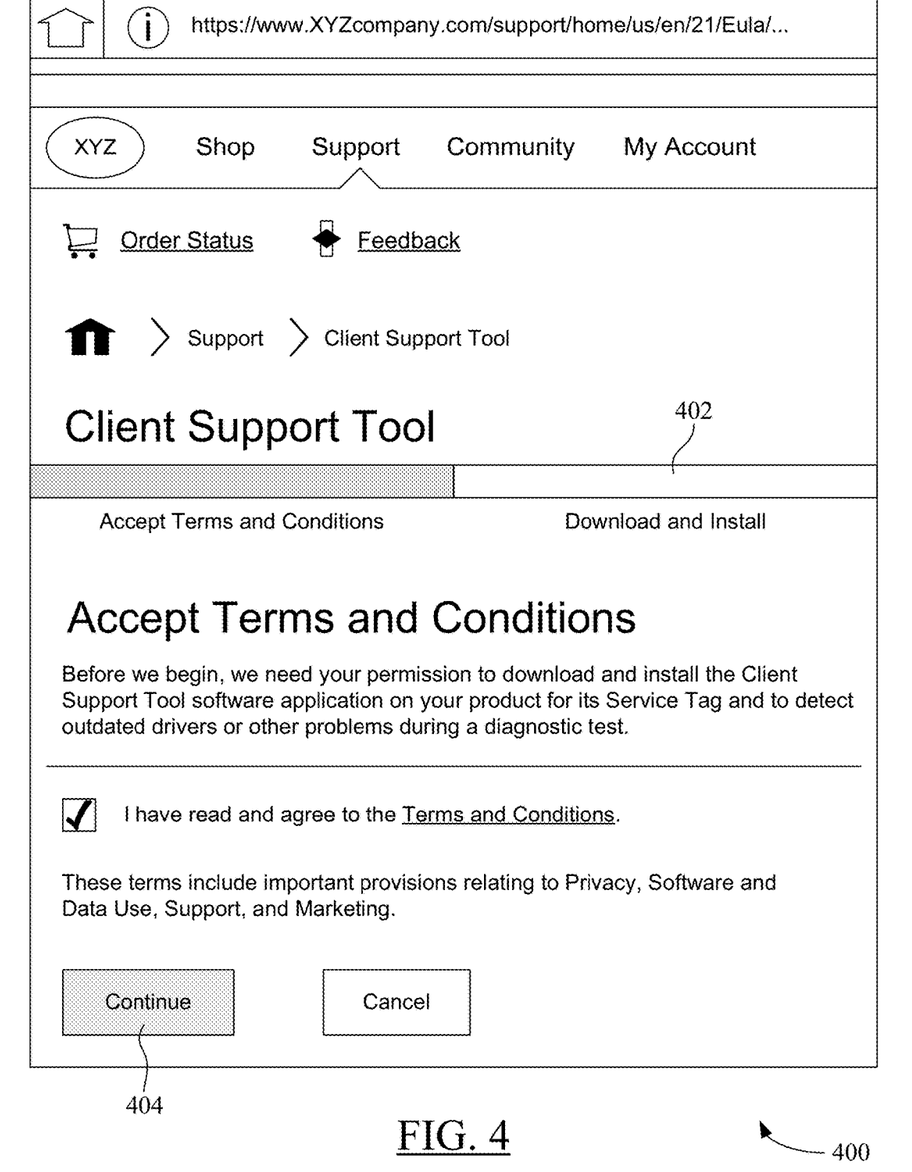
FIG. 4 shows an exemplary screenshot of a web page where terms and conditions of an End User License Agreement (EULA) may be presented to a user for acceptance before download and install of the HTTPS-enabled client tool can begin in certain embodiments of the present disclosure.

FIG. 4 shows an exemplary screenshot of a web page 400 where terms and conditions of an End User License Agreement (EULA) may be presented to a user for acceptance before download and install of the HTTPS-enabled client tool 102 can begin in certain embodiments of the present disclosure. If the client tool 102 is not already installed in the user's system 104, the user may be directed to the EULA web page 400 from the product support home page 300 (FIG. 3) regardless of whether the user searches submits the product information through the field 302 or elects the automatic detection option 304 on the home page 300. As shown in FIG. 4, the "Download and Install" option 402 may be available to the user after the user accepts the terms and conditions of the EULA for the client support tool 102 and selects the "Continue" radio button 404. Thereafter, the user can download and install the client tool software 102. Other details in FIG. 4 are self-explanatory and, hence, are not discussed further. It is noted here that the implementation of EULA option may differ from vendor to vendor. In certain embodiments, the user may be allowed to download the client tool 102 (for example, from the support home page 300 or any other web page on the product support site), but may be required to accept the corresponding EULA prior to installing the client tool 102.

Figure 5:
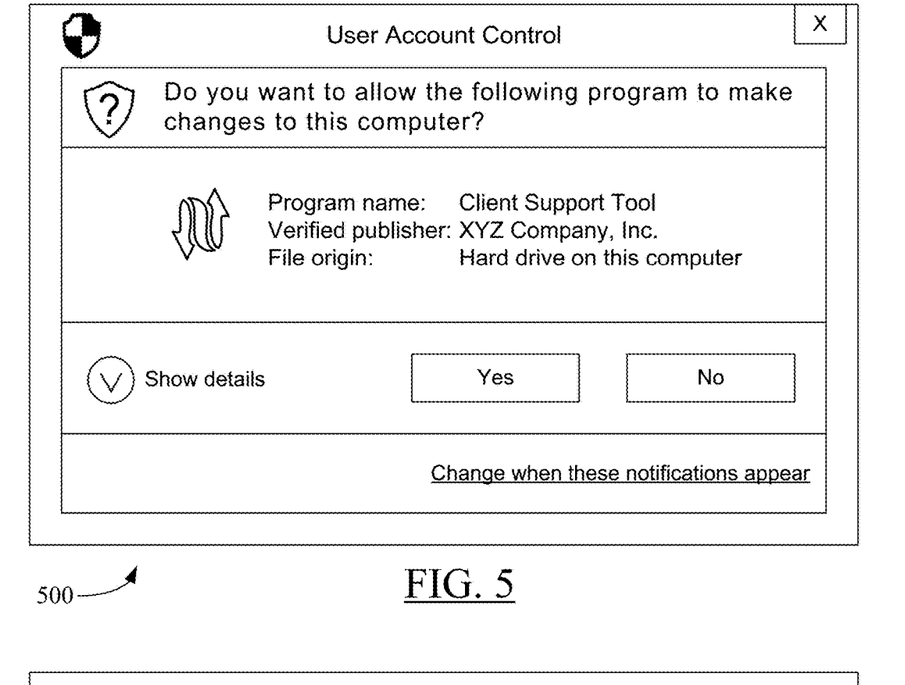
FIG. 5 is an exemplary screenshot of an OS-generated message presented to a user during installation of the HTTPS-enabled client tool on the user's computing system as per particular embodiments of the present disclosure.

FIG. 5 is an exemplary screenshot of an OS-generated message 500 presented to a user during installation of the HTTPS-enabled client tool 102 on the user's computing system 104 as per particular embodiments of the present disclosure. In case of the Windows® OS, during installation of the client tool 102, the program code for the client tool 102 may interact with the operating system to provide a User Account Control (UAC) message 500 to the user prompting the user to authorize registration of a digital certificate (to be created by the client tool 102) to the Windows® certificate store on the client system 104. As shown in the message 500, the certificate may be a self-signed certificate listing the XYZ Company itself as the "verified publisher" of the certificate. In one embodiment, the client tool 102 may have a certificate creation tool/utility (for example, a "MakeCert.EXE" tool) bundled with it to create a root certificate and server certificate for the domain "localhost." Before executing the MakerCert.EXE tool, the client tool 102 may first validate its Merkle Damgård hash value (popularly known as the "MD5" value) to verify the integrity of the certificate creation tool downloaded along with the client tool 102. Any data corruption during download may result in the mismatch of received and calculated MD5 checksum values, prompting the client tool 102 to alert the user through an error message on the display screen of the computer system 104 and request the user to re-download the entire client tool package from the product support website represented by the remote browser 106.

Thus, in particular embodiments of the present disclosure, the digital certificate needed for client-server authentication as part of the HTTPS protocol is not bundled along with the client tool 102. Rather, a unique, self-signed certificate is created on the fly while installing the application 102 in the client machine 104. For example, in some embodiments, the remote browser 106 where the user of the client machine 104 is visiting the product support site may have a client-side javascript file which calls the client tool 102 using a "localhost" request. As the "XYZCompany.com" represents the domain name of the XYZ Company's web server (s), the "localhost" may represent the domain name of the client machine 104. The digital certificate may be uniquely associated with the client machine 104 and the remote browser 106. As noted before, in an HTTPS-based remote product support session, the client machine 104 may function as an HTTPS "server" whereas the remote browser 106 may function as an HTTPS "client" during the HTTPS communication therebetween. In particular embodiments, the purpose of this digital certificate may be restricted to enable client-server authentication. In other words, the certificate may be usable for client-server authentication purpose in the bi-directional HTTPS communication between the computing system 104 (functioning as a "server") and the remote browser 106 (functioning as a "client"). Once the certificate is successfully created, the client tool 102 may bind this server authentication certificate with the port in the computing system 104 where the client tool's HttpListener is running on (for example, port 8881). The client tool 102 (and, hence, the computing system 104) may then send the digital certificate over the IP network 108 to the remote browser 106 for authentication of the computing system 104 as a "server" in the HTTPS communication. Upon successful authentication, the client tool 102 can now "listen" and respond to the HTTPS requests 112 by the remote browser 106 (associated with the "XYZCompany.com" domain in FIGS. 3-4).

In particular embodiments, the execution of the program code for the client tool 102 may configure the computing system 104 to prevent generation of digital certificates for websites other than the website/domain associated with the remote browser 106 for the purpose of remote product support and troubleshooting. In this manner, it can be assured that the client product 104 is securely supported through the website of the authorized service provider (here, by the remote browser 106). Furthermore, in certain embodiments, the client tool 102 creates the digital certificate with a minimal validity period of one (1) day so that it cannot be reused the next day. This is not just beneficial for the client computer's 104 security, but is desirable as well because, typically, a remote troubleshooting session does not extend for more than a couple of hours. Therefore, there is no need to have a digital certificate with extended validity—for example, a validity of one year or more—which may jeopardize a computing system's security in the future through misuse of the certificate by malware or a rogue application.

Additionally, the digital certificate created by the client tool 102 may not be static. Rather, the certificate may be dynamically renewed at pre-defined time intervals during an HTTPS support session with the remote browser 106. For example, in certain embodiments, the digital certificate may be renewed every one (1) hour during its validity period (of one day) so long as the corresponding HTTPS communication session with the remote browser 106 is active. However, if the support session lasts for less than an hour, then there may be no need to renew the initially-created certificate. In particular embodiments, the client tool 102 may renew the current certificate and also generate a new private key for the renewed certificate at the pre-defined renewal interval (here, one hour). Furthermore, during the ongoing HTTPS session, the client tool 102 also may re-authenticate the renewed certificate with the remote website host 106 through the HTTPS client-server authentication procedure. In certain embodiments, the renewed certificate also may be bound to the client system's 104 port on which the client tool's HttpListener is running (for example, the port 8881 mentioned before). Such binding may, however, exclude downloads of drivers and Object Data Embedding (ODE) files (for ODE scan features) from the remote browser 106. Thus, through dynamic renewal, the client tool 102 can assure that the same certificate is not used for an extended period of time to potentially make the client system 104 vulnerable to online security threats.

As noted before, the client tool 102 may store the created digital certificate in a certificate store managed by the OS 110 such as, for example, the Windows® certificate store. When the HTTPS session with the remote browser 106 terminates, the client tool 102 may delete the digital certificate stored in the certificate store. In some embodiments, such deletion may occur when the user exits or stops the client tool 102 running on the computer 104. The stored certificate also may be cleaned up from the certificate store when the HTTPS session is abruptly terminated or interrupted—for example, when the user exits or stops the client tool 102 during an on-going HTTPS session with the remote browser 106. In case of an extended support session requiring generation of renewal certificate(s) as mentioned above, the client tool 102 may store the most-recently renewed version of the digital certificate in the Windows® certificate store, while deleting all earlier versions of the certificate from the certificate store. As before, upon routine termination or unexpected interruption of the currently-active HTTPS session with the remote browser 106, the client tool 102 may delete the most-recently renewed version of the digital certificate stored in the certificate store. Such prompt deletions afford additional security and protections against possible misuse of the certificate(s).

The private key of a digital certificate (whether original or renewed) created by the client tool 102 may be uniquely associated with the corresponding digital certificate, and with the client computing system 104. Hence, the private key may not be shared among multiple client systems. Furthermore, in particular embodiments, the private key of the root digital certificate may be deleted (or made unavailable) in the client system 104 once the server authentication certificate is created upon successful authentication (or re-authentication, if applicable) of the client system 104 by the remote browser 106. Because a certificate's private key is deleted/unavailable in the client system 104, the certificate cannot be misused. Consequently, the client tool 102 assures that the client machine 104 is not vulnerable and more secured by using the local self-signed certificate with its deleted/unavailable private key. In some embodiments, the private key of a corresponding digital certificate (whether original or renewed) may be stored in the Windows® certificate store along with the certificate and may be removed from the certificate store when the corresponding certificate is deleted from the certificate store. As noted, in some embodiments, the private key may be deleted or made unavailable in the certificate store in the client system 104 as soon as the client system 104 is authenticated.

Figure 6:
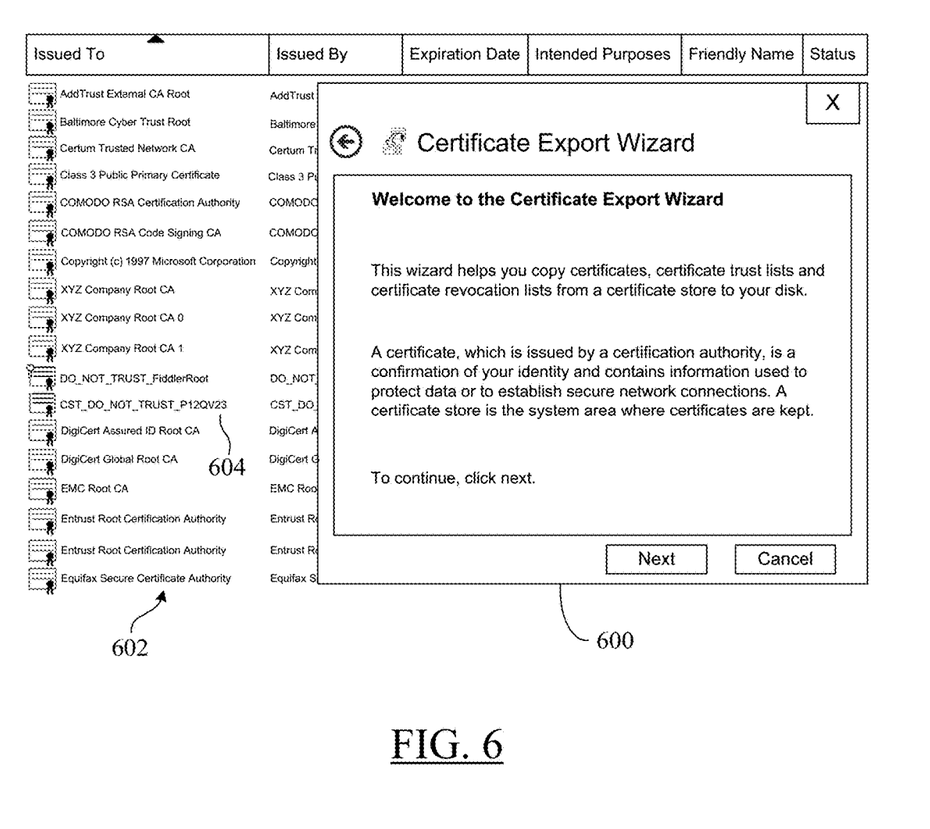
FIG. 6 shows an exemplary screenshot of an OS-generated message for exporting a digital certificate as per particular embodiments of the present disclosure.

FIG. 6 shows an exemplary screenshot of an OS-generated message 600 for exporting a digital certificate as per particular embodiments of the present disclosure. FIG. 6 also shows an exemplary list 602 of digital certificates stored in the Windows® certificate store of the associated computing system—such as the client computer 104 in FIG. 1. The message 600 may display a certificate export wizard to assist the user to select the certificates from the list 602 for exporting. It is observed from the list 602 that the key symbol ("♀") is not present in the self-signed digital certificate 604 for service tag "P12QV23". Hence, the private key for the certificate 604 is no more available in the client computer 104, which will ensure that the private key cannot be exported or regenerated.

In some embodiments, the client tool 102 may perform the following security measures before processing any request 112 (FIG. 1) from the remote browser 106: (i) The client tool 102 may respond to the requests made by the browsers supported by the manufacturer or vendor of the client system/product 104 or an entity authorized by the vendor. Thus, the client tool 102 may not respond to any requests made by a service or a command prompt utility running on the client system 104. (ii) The client tool 102 may serve the request(s) from the XYZCompany.com domain and send its response(s) 113 (FIG. 1) to that domain. (iii) Every request 112 may have the asymmetric secure token (per HTTPS protocol) which will be validated in the client tool 102. In certain embodiments, the client tool 102 may have the public key of the asymmetric crypto algorithm selected for handshake in the HTTPS communication. (iv) A used secured token cannot be reused for the next time. (v) Every secure token may be considered "valid" for a few seconds; it will be considered "expired" thereafter.

The process and tasks discussed with reference to FIGS. 2-6 ensure that the client machine 104 is not vulnerable during its HTTPS-based product support session with the remote browser 106. As a result, product support-related data, instructions, or other content may be exchanged securely between the client system 104 and the remote browser 106. The local self-signed certificate with validity of one day and mandatory auto-renewal of the certificate every hour during an extended HTTPS session provide additional measures of protection against possible misuse of the certificate. The deletion/unavailability of private key(s) in the client computer 104 and the deletion of corresponding digital certificates upon termination of the HTTPS session further maintain security of the content communicated between the client computer 104 and the remote browser 106.

FIG. 7 illustrates an example configuration of a computer system, such as the client computer 104, that can be used to implement the HTTPS-enabled client tool 102 described herein. The computer system (or computing device) 104 may be suitably configured to implement the functionality of the client tool 102 according to the teachings of the present disclosure. The computer system 104 may include one or more processors 702, a memory unit 704, an interface unit 706 providing communication interfaces, one or more input devices 708, one or more output devices 710, and a peripheral storage unit 712, connected to the processor 702 as shown and configured to communicate with each other, such as via one or more system buses (not shown) or other suitable connection.

In one embodiment, the input devices 708 may provide user inputs—such as user inputs received during implementation stages shown in FIGS. 3-6—to the processor 702 and the client tool 102 for further processing. The input devices 708 may include, for example, a touchpad, a camera, a computer keyboard, a touch-screen, a joystick, a physical or virtual "clickable button," a computer mouse/pointing device, and the like. A display screen is an example of the output device 710. Other examples of an output device include a graphics/display device, a computer screen or monitor, an alarm system, or any other type of data output device. In some embodiments, the input device(s) 708 and the output device(s) 710 may be coupled to the processor 702 via an I/O or peripheral interface(s). In some embodiments, the computer system 104 may include more than one instance of the devices shown. In various embodiments, all of the components shown in FIG. 7 may be housed within a single housing. In other embodiments, the computer system 104 may not include all of the components shown in FIG. 7. Furthermore, the computing device 104 may be configured as a standalone system, as a server system, as a client system, or in any other suitable form factor.

The processor 702 is a hardware device that may include a single processing unit or a number of processing units, all of which may include single or multiple computing units or multiple cores. When the computing device 104 is a multi-processor system, there may be more than one instance of the processor 702 or there may be multiple processors coupled to the processor 702 via their respective interfaces (not shown). The processor 702 may include an integrated Graphics Processing Unit (GPU) or the GPU may be a separate processor device in the system 104. The processor 702 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 702 may be configured to fetch and execute computer-readable instructions stored in the memory 704, the peripheral storage 712, or other computer-readable media. In some embodiments, the processor 702 may be a System on Chip (SoC).

The memory 704 and the peripheral storage unit 712 are examples of non-transitory computer media (e.g., memory storage devices) for storing instructions that can be executed by the processor 702 to perform the various functions described herein. For example, the memory unit 704 may include both volatile memory and non-volatile memory (e.g., RAM, ROM, or the like) devices. Further, in particular embodiments, the peripheral storage unit 712 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices constituting the peripheral storage 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computing device 104 may also include one or more communication interfaces as part of its interface unit 706 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet (or, more generally, the IP network 108), and the like. Communication interfaces in the interface unit 706 can also provide communication with external storage (not shown), such as in a storage array, network attached storage, storage area network, one or more databases, or the like.

The computer storage media, such as the memory 704 and the mass storage devices in the peripheral storage 712, may be used to store software and data. For example, the computer storage media may be used to store the operating system (OS) 110 for the computing device 104, various device drivers for the device 104, various inputs provided by the user during the client tool implementation stages in FIGS. 3-6, and the data such as audio content, video content, text data, streaming content, or any other type of content. The computer storage media also may store software applications such as a word processing application, a spreadsheet application, the client tool 102, and the like. The program code for the software applications and the OS may be executed by the processor 702.

In one embodiment, a non-transitory, computer-readable data storage medium, such as, for example, the system memory 704 or the peripheral data storage unit 712 may store program code or software for the client tool 102 as per particular embodiments of the present disclosure. In the embodiment of FIG. 7, the system memory 704 is shown to include such program code. In the embodiment of FIG. 7, the client tool application 102 may operate in conjunction with the host OS 110 (FIG. 1). The processor 702 may be configured to execute the program code for the client tool 102, whereby the client computer (or computing device) 104 may be operative to perform various HTTPS-based communication tasks associated with the client tool 102 as per the teachings of the present disclosure. In one embodiment, such tasks may include, for example, the process steps illustrated in FIG. 2 as well as other tasks discussed with reference to FIGS. 3-6 such as, for example, generation of digital certificates and private keys, periodic renewal, storage and deletion of certificates, establishment of an HTTPS session with the remote browser 106 and transmission of system-specific hardware/software information to the remote browser 106, reception and processing of content sent by the remote browser 106, and so on. The program code or software for the client tool 102 may be proprietary software or open source software which, upon execution by the processor 702, may enable the computer system 104 to perform operations to support HTTPS communication with the remote browser 106 as per teachings of the present disclosure.

In particular embodiments, the computing device 104 may include an on-board power supply unit 714 to provide electrical power to various system components illustrated in FIG. 7. The power supply unit 714 may receive batteries or may be connectable to an AC electrical power outlet. In one embodiment, the power supply unit 714 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the client tool 102, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
creating, by a computing system, a digital certificate that is self-signed and that:
identifies the computing system as a server for a bi-directional Hypertext Transfer Protocol Secure (HTTPS) communication; and
identifies a remote browser as a client for the bi-directional HTTPS communication;
assigning the digital certificate a validity period of one day;
generating, by the computing system, a unique private key for the digital certificate;
providing, by the computing system, the digital certificate to the remote browser for authentication of the computing system as the server in the HTTPS communication; and
after successful authentication, performing, by the computing system, the bi-directional HTTPS communication with the remote browser;
while performing the bi-directional HTTPS communication, periodically renewing, by the computing system, the digital certificate at a pre-defined time interval within the validity period; and
making the unique private key unavailable in the computing system.

2. The method of claim 1, further comprising:
storing, by the computing system, the created digital certificate in a certificate store managed by an operating system for the computing system; and
deleting, by the computing system, the digital certificate stored in the certificate store upon termination of the HTTPS communication with the remote browser.

3. The method of claim 2, further comprising:
storing, by the computing system, a most-recently renewed version of the digital certificate in the certificate store;
deleting, by the computing system, all earlier versions of the digital certificate stored in the certificate store;
providing, by the computing system, the most-recently renewed version of the digital certificate to the remote browser for re-authentication of the computing system as the server in the HTTPS communication; and
deleting, by the computing system, the most-recently renewed version of the digital certificate stored in the certificate store upon termination of the HTTPS communication with the remote browser.

4. The method of claim 1, wherein the pre-defined time interval is one hour.

5. The method of claim 1, wherein creating the digital certificate comprises:
downloading, by the computing system, a software tool from a website associated with the remote browser, wherein the software tool is required for remote product support and troubleshooting of the computing system through the remote browser; and
creating, by the computing system, the digital certificate that is self-signed upon installation of the software tool in the computing system.

6. The method of claim 5, further comprising:
preventing, by the computing system, generation of digital certificates for websites other than the website associated with the remote browser for purpose of remote product support and troubleshooting.

7. The method of claim 1, wherein performing the bi-directional HTTPS communication comprises:
performing, by the computing system, the bi-directional HTTPS communication with the remote browser over an Internet Protocol (IP) network.

8. The method of claim 1, wherein performing the bi-directional HTTPS communication comprises:
receiving, by the computing system, an HTTPS request from the remote browser for a resource, wherein the resource comprises at least one of the following:
hardware configuration details of the computing system,
identification of software applications and software drivers installed on the computing system,
respective versions of the software drivers installed on the computing system, and
a diagnostic report of the computing system; and
sending, by the computing system, an HTTPS response to the remote browser containing requested resource.

9. A computing system comprising:
a memory storing program instructions; and
a processing unit coupled to the memory and operable to execute the program instructions to:
create a self signed digital certificate that is self-signed, the digital certificate:
identifying the computing system as a server for a bi-directional Hypertext Transfer Protocol Secure (HTTPS) communication; and
identifying a remote browser as a client for the bi-directional HTTPS communication;
assign the digital certificate a validity period of one day;
generate, by the computing system, a unique private key for the digital certificate;
provide the digital certificate to the remote browser for authentication of the computing system as the server in the HTTPS communication,
after successful authentication, perform the bi-directional HTTPS communication with the remote browser over an Internet Protocol (IP) network;
while performing the bi-directional HTTPS communication, periodically renew the digital certificate at a pre-defined time interval within the validity period; and
make the unique private key unavailable in the computing system.

10. The computing system of claim 9, wherein the program instructions are part of a software tool downloaded into the memory from a website associated with the remote browser, wherein the software tool is required for remote product support and troubleshooting of the computing system through the remote browser,
wherein the program instructions, upon execution by the processing unit, cause the computing system to:
create the digital certificate that is self-signed upon installation of the software tool in the computing system; and
prevent generation of digital certificates for websites other than the website associated with the remote browser for purpose of remote product support and troubleshooting.

11. The computing system of claim 9, wherein the program instructions, upon execution by the processing unit, cause the computing system to:
store the created digital certificate in a certificate store managed by an operating system for the computing system; and
delete the digital certificate stored in the certificate store upon termination of the HTTPS communication with the remote browser.

12. The computing system of claim 11, wherein the program instructions, upon execution by the processing unit, cause the computing system to:

store a most-recently renewed version of the digital certificate in the certificate store;
delete all earlier versions of the digital certificate stored in the certificate store;
provide the most-recently renewed version of the digital certificate to the remote browser for re-authentication of the computing system as the server in the HTTPS communication; and
delete the most-recently renewed version of the digital certificate stored in the certificate store upon termination of the HTTPS communication with the remote browser.

13. The computing system of claim 9, wherein the pre-defined time interval is one hour.

14. The computing system of claim 9, wherein the program instructions, upon execution by the processing unit, cause the computing system to:
receive an HTTPS request from the remote browser for a resource, wherein the resource comprises at least one of the following:
hardware configuration details of the computing system,
identification of software applications and software drivers installed on the computing system,
respective versions of the software drivers installed on the computing system, and
a diagnostic report of the computing system; and
send an HTTPS response to the remote browser containing requested resource.

15. A computer program product comprising a non-transitory computer-usable medium having computer-readable program code embodied therein, the computer-readable program code executable by a computing system to perform operations comprising:
creating, by the computing system, a digital certificate that is self-signed, the digital certificate:
identifying the computing system as a server for a bi-directional Hypertext Transfer Protocol Secure (HTTPS) communications; and
identifying a remote browser as a client for the bi-directional HTTPS communication;
assigning the digital certificate a validity period of one day;
generating, by the computing system, a unique private key for the digital certificate;
providing, by the computing system, the digital certificate to the remote browser for authentication of the computing system as the server in the HTTPS communication; and
after successful authentication, performing, by the computing system, the bi-directional HTTPS communication with the remote browser;
while performing the bi-directional HTTPS communication, periodically renewing the digital certificate at a pre-defined time interval within the validity period; and
making the unique private key unavailable in the computing system.

16. The computer program product of claim 15, wherein the operations further comprise:
storing the created digital certificate in a certificate store managed by an operating system for the computing system; and
deleting the digital certificate stored in the certificate store upon termination of the HTTPS communication with the remote browser.

17. The computer program product of claim 16, wherein the operations further comprise:
storing a most-recently renewed version of the digital certificate in the certificate store;
deleting all earlier versions of the digital certificate stored in the certificate store;
providing the most-recently renewed version of the digital certificate to the remote browser for re-authentication of the computing system as the server in the HTTPS communication; and
deleting the most-recently renewed version of the digital certificate stored in the certificate store upon termination of the HTTPS communication with the remote browser.

18. The computer program product of claim 15, wherein performing the bi-directional HTTPS communication comprises:
receiving, over a communication network, an HTTPS request from the remote browser for a resource, wherein the resource comprises at least one of the following:
hardware configuration details of the computing system,
identification of software applications and software drivers installed on the computing system,
respective versions of the software drivers installed on the computing system, and
a diagnostic report of the computing system; and
sending, over the communication network, an HTTPS response to the remote browser containing requested resource.

19. The computer program product claim 15, wherein the creating comprises:
creating the digital certificate that is self-signed during execution of the program code by the computing system; and
preventing generation of digital certificates for websites other than a website associated with the remote browser for purpose of remote product support and troubleshooting.

20. The computer program product of claim 15, wherein performing the bi-directional HTTPS communication comprises:
performing the bi-directional HTTPS communication with the remote browser over an Internet Protocol (IP) network.

* * * * *

UNITED STATES PATENT AND TRADEMARK OFFICE
CERTIFICATE OF CORRECTION

PATENT NO. : 10,432,613 B2  
APPLICATION NO. : 15/684529  
DATED : October 1, 2019  
INVENTOR(S) : Sahul Amid

Page 1 of 1

It is certified that error appears in the above-identified patent and that said Letters Patent is hereby corrected as shown below:

In the Claims

Claim 9, Column 18, Line 22, and delete the words "self-signed" after the word "a" and before the word "digital"

Signed and Sealed this  
Twenty-sixth Day of November, 2019

Andrei Iancu  
*Director of the United States Patent and Trademark Office*